Dec. 12, 1967  R. F. POWER ET AL  3,357,926
CLOUD SEEDING APPARATUS
Filed Feb. 17, 1965  2 Sheets—Sheet 1
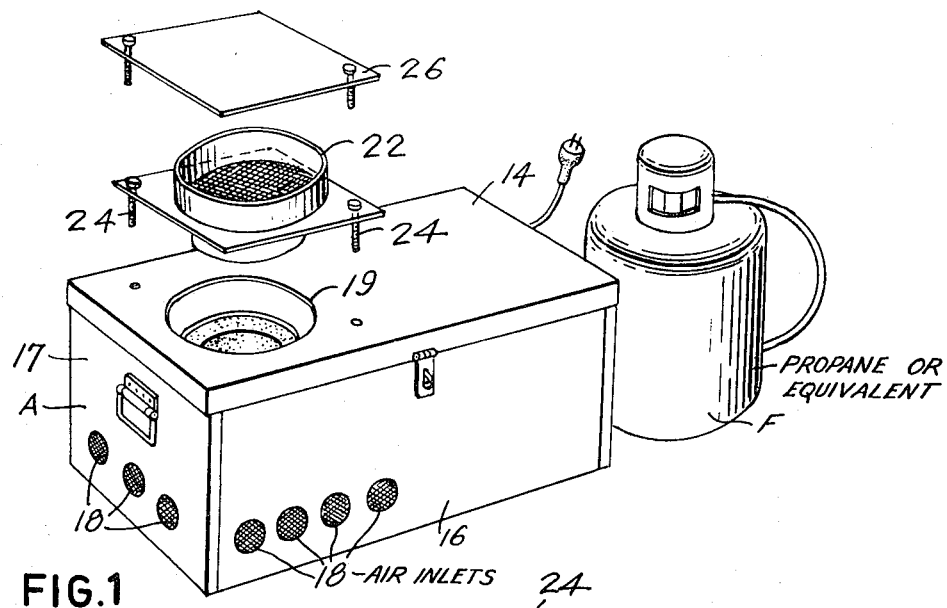
FIG.1
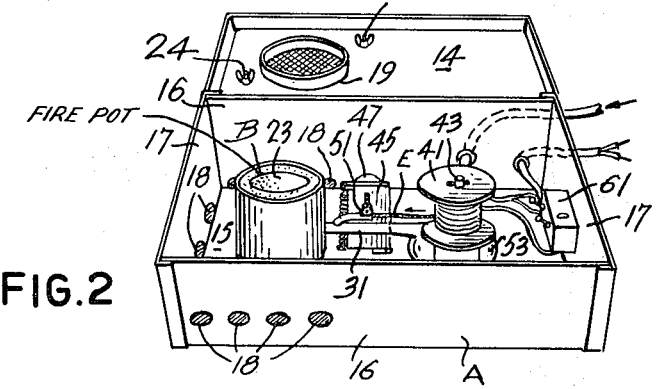
FIG.2
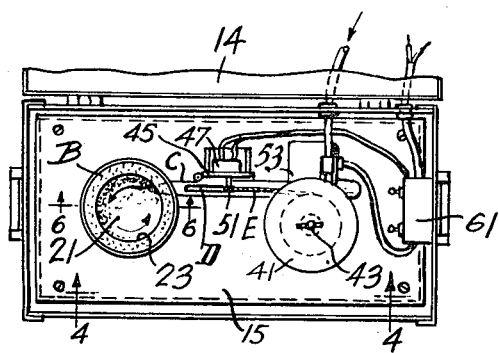
FIG.3
INVENTORS
Robert F. POWER
Bernard A. POWER
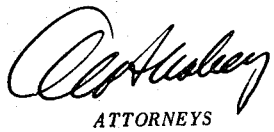
ATTORNEYS Dec. 12, 1967   R. F. POWER ET AL   3,357,926
CLOUD SEEDING APPARATUS
Filed Feb. 17, 1965   2 Sheets-Sheet 2
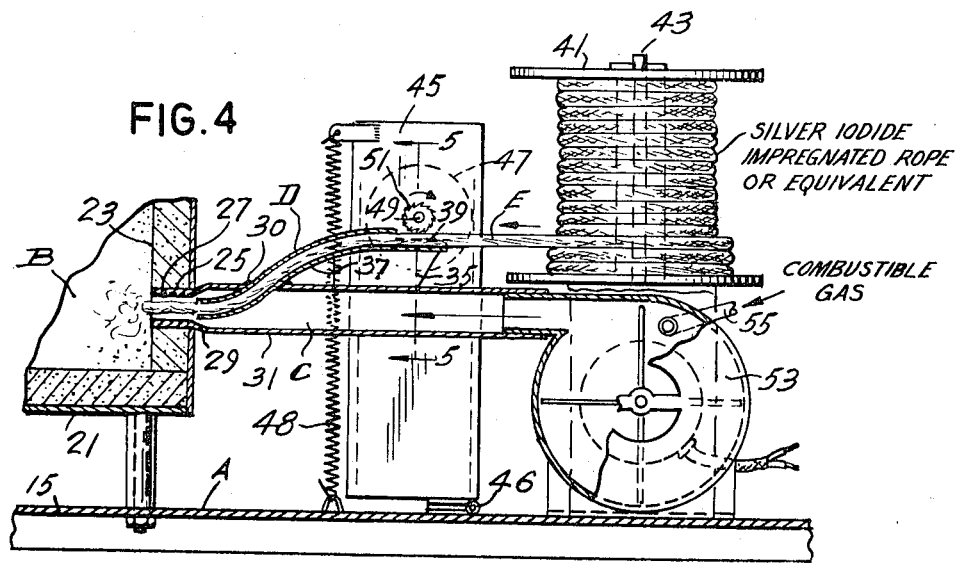
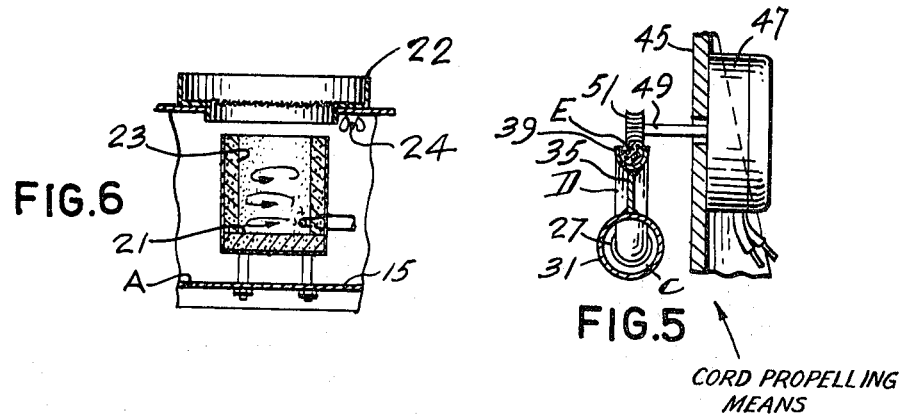
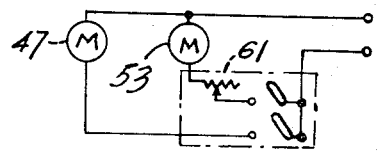
FIG.7
INVENTORS
Robert F. POWER
Bernard A. POWER
ATTORNEYS

3,357,926
CLOUD SEEDING APPARATUS
Robert F. Power, 510 Lakeshore Drive, and Bernard A. Power, 37 Touzin Ave., both of Dorval, Quebec, Canada
Filed Feb. 17, 1965, Ser. No. 433,333
11 Claims. (Cl. 252—359)

This invention relates to the seeding of clouds for the purpose of modifying the weather.

A main means of modifying precipitation has been to disperse some chemical, for example silver iodide, into the atmosphere. This has the effect of causing freezing of super-cooled cloud droplets and thereby initiating the snow crystal growth process. The problem has been to regulate the formation of the silver iodide crystals so as to produce proper numbers of crystals and crystals of a type which are active in crystallizing cloud droplets. A shortcoming of existing methods has been that the temperature of vaporization has been limited to between 1800° F. and 2300° F. at which the numbers of crystals is limited. One prior method involves the injection into a propane flame (under normal, i.e. not forced air draft) of a solution of silver iodide in acetone as the combustible. This gives vaporization of the silver iodide at temperatures not over 1800° F. to 1850° F. This open flame arrangement is subject to the flame being extinguished by wind variations and by heavy rain or heavy snowfall. In another method, fine granular coke (maximum grain size, approximately ¼ inch) is soaked in the silver iodide acetone solution and dried. This coke mixture is then burned in a small furnace. The maximum temperature obtained is not over approximately 2200° F. and the coke dust tends to readily clog the mechanism for feeding the coke into the furnace.

The present invention aims to overcome the shortcomings of the prior methods and to provide positive advantages. In accordance with the invention the silver iodide may be vaporized at a higher temperature than previously, thus increasing the number of crystals produced per unit quantity of the chemical, and the higher temperature also oxidizes the surface of the crystals thereby increasing their ice-nucleating efficiency.

The invention comprises continuously feeding a silver iodide-impregnated cord of combustible material simultaneously with a combustible gas and an oxygen containing gas under forced draft into a combustion zone to sustain combustion at a temperature of at least 2600° F. thereby to burn the cord and to vaporize and recrystallize the silver iodide and to cause it to disperse into the atmosphere. The gas mixture is preferably introduced into the combustion zone in a direction such as to cause a swirling motion of the flame about the zone.

An apparatus suitable for carrying out this process includes a fire-pot having a refractory base and upwardly extending cylindrical refractory-lined wall terminating in an upper open end serving as a flue. The wall has a feed opening for introducing gas at an angle to provide a swirling motion and the silver iodide in continuous solid form, for example as in a cord. The feed tube connects the feed opening with a source of combustible gas and oxygen-containing gas and is linked to the blower. The feed tube for the cord joins the gas feed tube near the fire-pot so that the cord may be fed through the feed opening with the gas, sufficient clearance being provided between the wall of the tube and the cord. Means is provided for feeding the cord into and through the feed tube at a controlled rate. Means is also provided to regulate the flow of gases.

The invention will be described in more detail by reference to the accompanying drawings, which illustrate a preferred apparatus according to the invention, and in which FIGURE 1 is a perspective view of the preferred apparatus with the cover closed, the view being partly exploded to show the removable stack plate and cover plate.

FIGURE 2 is a perspective view looking in a downward direction on the apparatus of FIGURE 1 with the cover open.

FIGURE 3 is a plan view of the apparatus shown in FIGURES 1 and 2.

FIGURE 4 is an enlarged vertical cross-section along the line 4—4 of FIGURE 3 showing particularly the construction of the fire-pot.

FIGURE 5 is an enlarged cross-section along the line 5—5 of FIGURE 4.

FIGURE 6 is an enlarged vertical cross-section along the line 6—6 of FIGURE 3.

FIGURE 7 is a wiring diagram.

Referring more particularly to the drawings, A represents a casing in which apparatus according to the invention is housed. The casing A is made up of a floor 15, side walls 16 and end walls 17. The casing is also provided with a cover 14 hinged to the top of a side wall 16. Screened air openings 18 are provided in the side and end walls. A stack opening 19 is provided in the cover 14. A removable stack plate 20 with a screened stack 22 fits on the cover over the stack opening 19 and is held in place by screws 24. A stack plate 26 is provided to close the opening 19 when the apparatus is not in use. On the floor 15 at one end thereof is a fire-pot B having a refractory-lined base 21 and an upwardly extending refractory-lined wall 23. The wall 23 is provided with an inlet opening 25. Protruding into the inlet opening is the nozzle 27 of a feed tube C. The feed tube C has an end of reduced size constituting the nozzle 27 which is connected to a tapered part 29 leading from a cylindrical body part 31 of the tube C. The nozzle 27 protrudes from the opening 25 into the fire-pot B.

Welded to the top of the part 31 of the tube C is a frame piece 35 having a curved upper face 37. A cord feed tube D is welded to the face 37 and extends towards the fire-pot and downwardly through an opening 30 in the cylindrical body part 31 of the tube C and projects within the tube C to a position within the tapered part 29. The end of the tube D remote from the fire-pot B is half cut away as shown to provide a projecting semi-cylindrical lip 39 serving as a support.

Silver iodide-impregnated rope or cord E is fed into and through the tube D as shown and as will be described. A combustible gas and an oxygen-containing gas (usually air) is fed through the tube C and in this way the cord E and the gases are fed through the nozzle 27 at the same time and in a manner which will be detailed later.

The cord E is supplied from a reel 41 which is mounted on a spindle 43 held to the floor 15. A panel 45 extending upwardly from the floor 15 to which it is mounted by a hinge 46 carries an electric motor 47 having a drive shaft 49 which extends through the panel 45 and carries on its end a gear wheel 51 which engages the cord E. A spring 48 urges the panel 45 in a downward direction and the gear wheel 51 against the part of the cord E held on the lip 39.

The end of the tube C remote from the fire-pot B is connected to a blower 53. A pipeline 55 leads to the tube C from a source of combustible gas, for example a cylinder F containing propane. Air is introduced through holes 18 in the walls 16 and 17 of the blower casing.

A control box 61 carries the appropriate electrical apparatus which is connected by suitable wiring to the electric motor 47. An appropriate control is provided to control the gas entering the pipe C. A regulator with a needle valve for fine adjustment is attached to the propane tank.

*Operation*

In operation the combustible gas, for example propane, and oxygen-containing gas, usually air, is fed to the pipe C continually and this feed is controlled to give the right proportion of combustible gas to oxygen and flame is induced in the fire-pot B by lighting the combustible gas and causing continuous combustion.

The silver iodide-containing cord D is continuously fed at a fixed speed typically four feet per hour or sixteen feet per hour to cause its substantially complete combustion in the flame in the fire-pot near the nozzle 27. This feed is accomplished by the rotating gear 51 which positively engages the cord D, being urged against the cord D which in turn is held on the support 39.

The products of combustion, mainly silver iodide crystals and residue of the cord, are blown out of the flue of the fire-pot B through the stack 22 into the atmosphere. The action of the blower and the forced feed of the gas causes a swirling motion in the fire-pot causing the flame to swirl. The combustion is substantially complete and very little but silver iodide crystals is blown into the atmosphere. The silver iodide will be scattered by the wind and carried upward by the naturally occurring vertical currents and dispersed into a cloud of super-cooled water droplets.

Regulation of the operation is accomplished as follows. The fixed quantity is the rate at which air is supplied to the furnace by the blower. This rate is fifteen cubic feet per hour driven by a blower motor operating at approximately 12,000 r.p.m. At this fixed rate of air feed from .8 to 1.2 pounds of propane per hour is burned. The gas to the furnace is controlled by the regulator on the propane tank with the needle valve manually adjusted to give the maximum heat, that is, maximum combustion. When adjusted in this fashion, the heat supplied is sufficient to burn completely any size cord up to $7/32$ inch diameter, up to a maximum of sixteen feet of this size cord per hour. Thus, the gas flow is not adjusted for each cord size but instead, a set flow is used which covers any operations up to the limit mentioned. Practical cord is ordinary cotton sash cord. The cord may vary from size No. 5 to No. 7, that is, from $5/32$ inch diameter to $7/32$ inch. Thee maximum amount of silver iodide per foot of No. 7 sash cord is 0.106 ounce. Criteria of the cord or other solid body in which the silver iodide is contained is that it be a continuous flexible body which can be manipulated in the manner described to feed it, along with the gases, to the combustion zone.

Air is the practical source of oxygen for the combustion and therefore the invention has been described in terms of using air. It will be understood that the spirit of the invention includes any oxygen-containing gas capable of fulfilling the function of supplying oxygen for the combustion.

The meteorological aspects of dispersing silver iodide into the atmosphere are known. For example, it is well understood that the crystals must be dispersed at such an area that they are carried upwards into the weather system so as to reach the clouds over the target area. The super-cooled clouds will be at a temperature of $-4°$ C. or colder. Those skilled in the art know the precise type of atmosphere into which the silver iodide crystals must be dispersed in order to produce precipitation over a target area.

We claim:

1. An apparatus for generating silver iodide crystals, comprising, a cylindrical fire-pot having a refractory-lined base and refractory-lined cylindrical wall extending upwardly therefrom to terminate in an open end serving as a flue, said wall having a feed opening near the base for introducing a combustible gas and an oxygen-containing gas into said fire-pot at an angle such as to cause a swirling motion, a gas feed tube for combustible gas leading to the feed opening from a source of the combustible gas and oxygen-containing gas, a blower having a connection with the feed tube, a silver iodide-impregnated cord and a feed tube for said cord leading into the gas tube near the fire-pot and means for propelling the cord into the cord tube whereby it is fed to the feed opening as required for combustion.

2. An apparatus, as defined in claim 1, in which the means for propelling the cord into the cord tube comprises a support over which the cord passes and a gear above said support placed so that the cord is held between the gear and the support and means for rotating the gear at a predetermined speed thereby to propel the cord from said support into said tube.

3. An apparatus, as defined in claim 1, in which the inlet end of said cord feed tube is cylindrical and is partly cut away to form an arcuate lip projecting from the cylindrical part of the tube, said lip constituting a base for the cord, and said propelling means comprising rotary means spaced from said lip adapted to engage the cord between it and the lip and means for actuating said rotary means to propel the cord from the lip along the cord feed tube.

4. An apparatus for generating silver iodide crystals, comprising, means forming a combustion chamber having a wall, a passageway for air and gas leading to said wall having a feed opening, means forming a passageway leading to said feed opening, a silver iodide impregnated cord, a feed tube forming a passageway for the cord leading to said gas passageway adjacent to the combustion chamber, means for forced feed of air and a combustible gas through said gas passageway, and means for feeding said cord through said feed tube whereby the gas and cord may be fed to support combustion and the products of combustion are driven into the atmosphere by said forced draft.

5. Apparatus for generating a precipitation-inducing product of combustion, comprising:
  a fire-pot having a combustion-chamber opening at one end and forming a flue;
    said fire-pot including a feed-opening near a lower portion of said combustion chamber and said feed-opening being directed angularly into said chamber for producing a swirling motion to the products of combustion;
  gas-feed tube means communicating with said feed-opening;
  a source of combustible gas connected to said gas-feed tube means;
  force-draft means connected to said gas-feed tube means for expressing the combustible gas into said combustion chamber;
  a continuous strand of precipitation-producing combustible material extending into said gas-feed tube means and through said feed opening and into said combustion chamber whereby the products of combustion of said strand will cause precipitation when emitted into the atmosphere; and
  means engaging said strand and including a portion for progressively propelling said strand within said gas-feed tube means and to said combustion chamber as the strand is consumed only in said combustion chamber.

6. The structure as claimed in claim 5 in which said combustion chamber is cylindrical and closed adjacent the end with which said feed-opening communicates.

7. The structure as claimed in claim 5 in which said force draft means comprises a fan assembly including a housing, said source of combustion-supporting gas including a pressurized tank of gas adjustably communicating with the interior of said housing.

8. The apparatus as claimed in claim 5 including an enclosing portable casing having an air-inlet opening, and an exhaust opening in said casing communicating with said fire-pot flue opening whereby products of combustion are discharged therethrough.

9. The structure as claimed in claim 5 in which a strand-feed tube extends into said gas-feed tube means and includes a terminal end portion surrounded by said gas-feed tube means, said gas-feed tube means forming an annular passage about said strand feed tube, said strand being threaded through said strand feed tube.

10. The structure as claimed in claim 9 in which said means for propelling said strand includes a power-driven element engaging said strand.

11. The structure as claimed in claim 10 in which said power driven element comprises means biasing said element into engagement with said strand and toward a portion of said strand feed tube.

References Cited

UNITED STATES PATENTS

| | | | |
|---|---|---|---|
| 1,662,939 | 3/1928 | Schutz | 110—22 |
| 2,077,129 | 4/1937 | Perkins | 67—53 |
| 2,527,231 | 10/1950 | Vonnegut | 239—2 |
| 2,741,601 | 4/1956 | MacCready | 239—2 |
| 3,262,623 | 7/1966 | Bosteels | 226—174 |

WILBUR L. BASCOMB, Jr., *Primary Examiner.*

M. HENSON WOOD, Jr., EVERETT W. KIRBY,
*Examiners.*

J. SOFER, R. S. STROBEL, *Assistant Examiners.*